Jan. 9, 1951  G. F. BRADSTREET  2,537,440
DEVICE FOR APPLYING CHAINS TO TIRES
Filed Nov. 20, 1946
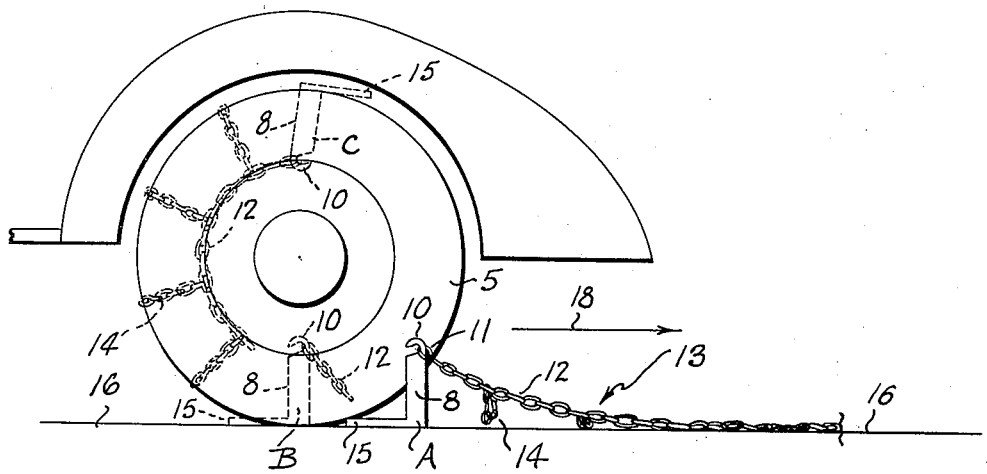
Fig. 1.
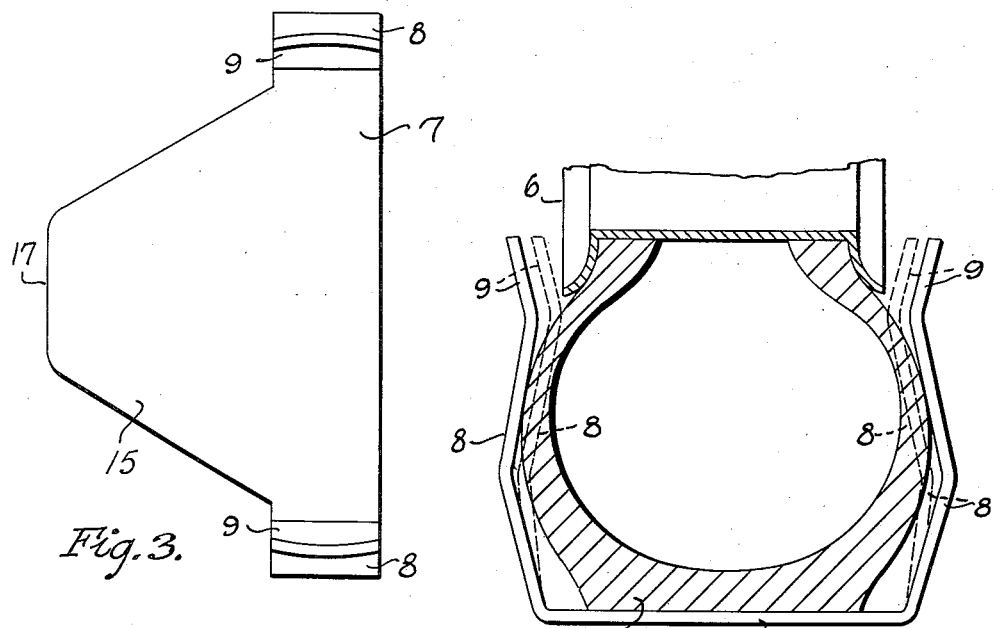
Fig. 3.
Fig. 2.
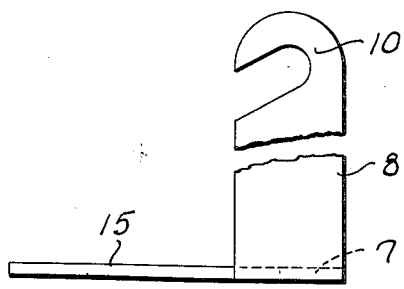
Fig. 4.
Inventor
George F. Bradstreet
By Wooster & Davis
Attorneys Patented Jan. 9, 1951

2,537,440

UNITED STATES PATENT OFFICE 2,537,440

DEVICE FOR APPLYING CHAINS TO TIRES

George F. Bradstreet, Bridgeport, Conn.

Application November 20, 1946, Serial No. 711,172

1 Claim. (Cl. 81—15.8)

This invention relates to a device for facilitating the application of antiskid tire chains to the tires of automobiles. In the present day cars, due to the large size of the tires, and especially with the low-hanging mudguards now commonly employed, it is often very difficult to apply antiskid chains to these tires, especially for the ordinary driver in his home garage, necessitating that he go to a service station to have his chains applied. This means that either the chains will not be applied when they should be and the car will be driven under dangerous conditions without them, or, after once being applied, will be left on the tire after the road surface conditions improve, so that the chain will be used when not necessary and will be quickly worn out by such use. It is therefore an object of the present invention to provide a simple and effective device which may be readily employed by the ordinary driver, either in his garage or on the street, for quickly and easily applying antiskid chains to his tires.

Another object is to provide a construction in which it is not necessary for the operator to apply the device to a tire by forcing it onto the tire, but the device may be simply placed in a certain position on the garage floor or pavement, and it will apply itself to the tire by a rolling motion of the tire, and then, by a continuation of this rolling motion will draw the chain into proper position on the tire.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side view of an automobile wheel and mudguard indicating how the device is employed in applying an antiskid chain to the tire;

Fig. 2 is a transverse section of the tire and rim showing the device applied to the tire;

Fig. 3 is a top plan view of the device removed, and

Fig. 4 is an end view thereof looking toward the bottom of Fig. 3.

The usual type of rubber tire casing is shown at 5 on the usual wheel rim 6, the usual inner tube being omitted. The device comprises a substantially U-shaped member including a base member or connecting bar 7 and spaced upright side arms 8 at the opposite ends of this bar. It is formed of flat strip metal of fairly heavy gauge, and the side arms 8 are curved inwardly or concaved at their mid-lengths, as shown in Fig. 2, so as to be capable of firmly gripping the sides of the tire. The upper ends are bent or inclined outwardly, as shown at 9, to facilitate application of the device to the tire in a manner presently to be described. These arms are spring arms, and being of relatively heavy gauge are capable of giving a good grip on the tire, and when in normal position removed from the tire they spring inwardly to substantially the dotted line position of Fig. 2. On the upper end of each of the side arms 8 is a hook 10 to receive the end links 11 of the side chains 12 of the usual type of antiskid chain 13, which chain, as in the usual construction, includes the two side chains 12 adapted to be positioned on the opposite sides of the tire, and connected by a plurality of cross chains 14 suitably spaced and connected at their opposite ends to the side chains 12.

It has been known to provide substantially U-shaped spring clips to grip the side walls of the tire, and provided with means to which the side chains may be connected to draw the antiskid chain around the tire, but due to the heavy spring action required to provide the necessary grip on the tire, it is often difficult for the ordinary driver, and particularly ladies, to apply such a device to the tire. In the present case this difficulty is overcome by providing on the forward edge of the lower connecting bar 7 and extending forwardly therefrom in substantially the plane of this bar, a lip or plate 15 which may be and preferably is tapered toward its free end. This plate is of sufficient length so that when the U-shaped portion of the clamp is placed to the rear of the tire with the upper ends of the side arms 8 just engaging the sides of the tire, as shown in the full line position A of Fig. 1, this lip or extension plate 15 will lie on the surface of the floor or pavement 16 with its forward edge 17 just engaging under the surface of the tread of the tire in the tapered recess between this tread and the floor surface. With the ordinary tires a length of about two or three inches for this lip is sufficient.

The forward links of the side chains 12 of the chains may now be linked over the hooks 10, as indicated in full lines, Fig. 1, and the rest of the chain spread out to the rear on the floor, as indicated at 13 in full lines, Fig. 1. Or the chains may be secured to the side arms before the device is placed at the rear of the tire. Then if now the operator backs the car, the tire will roll onto the extension or plate 15 between the side arms 8 spreading these arms from the dotted to the full line position as shown in Fig. 2, permitting the tire to roll between these arms, and then the spring action of these arms grips the opposite sides of the tire tightly. The tire is guided between the arms by the curved sides of the tire and the outwardly inclined upper end portions 9 of the side arms. The device is now substantially in the position shown in dotted lines at B in Fig. 1. As the tire rolls onto the top of the lip or plate 15, the weight or pressure of the tire holds the device upright, so that the pressure of the tire against the upper portions of the arms 8 cannot force or tip the device backwardly, and, therefore, the device is held in the upright position by the weight of the tire until the tire spreads these side arms and forces itself to the gripped position between these side arms. Therefore, it will be seen that the rolling motion of the tire of itself automatically applies the clamp to the tire in the clamped or gripping position, and it is not necessary for the operator to force the clamp over the tire. After the clamp is applied to the tire by this action, continued rearward rolling movement of the wheel and tire, as indicated by the arrow 18, carries this clamping device around the tire, as indicated at C in Fig. 1, and lays the chain over the tire, as shown by the dotted lines. This rolling movement is continued until the free ends of these side chains are brought together, and then the clamp may be removed and the ends of the side chains connected in the usual manner by the hooks or connecting means provided at the ends of these chains.

It will be seen from the above that the device is a very simple one, and therefore may be manufactured at relatively low cost, and will require little space in the tool box of a car; that it is not necessary for the operator to force the clamp onto the tire, but to merely set it up at the rear edge of the tire and it will be automatically forced to the clamping position by the rolling action of the tire, and then with continuation of this rolling action the chain is easily and quickly drawn to and laid in the proper position on the tire.

Having thus set forth the nature of my invention, I claim:

A device of the character described for applying non-skid chains to tires comprising a base member to be supported on a pavement surface and upright spring side arms at the opposite ends thereof yieldable to grip the sides of a tire and provided with means for attachment to the free ends of the side chains, and a plate extension located at the forward edge of the base member and extending forwardly therefrom, said extension being of sufficient length that when the device is located upright on said base member closely adjacent and to the rear of the tire it will extend at its forward edge to the surface of the tire tread adjacent the surface of the pavement and when the tire is rolled onto said plate and base member to retain the device in an upright position by weight of the tire on this extension so that the tire will roll to a position between the side arms and be gripped thereby.

GEORGE F. BRADSTREET.

REFERENCES CITED

The following references are of record in the file of this patent:

UNITED STATES PATENTS

| Number | Name | Date |
|---|---|---|
| 1,858,412 | Neumann | May 17, 1932 |
| 2,166,869 | Lees et al. | July 18, 1939 |
| 2,330,839 | O'Brien | Oct. 5, 1943 |

FOREIGN PATENTS

| Number | Country | Date |
|---|---|---|
| 151,113 | Switzerland | Nov. 30, 1931 |
| 798,045 | France | Feb. 24, 1936 |